United States Patent [19]

Fallon

[11] 3,808,380

[45] Apr. 30, 1974

[54] IDENTIFIER ARRANGEMENT

[75] Inventor: Joseph Rogers Fallon, Pickerington, Ohio

[73] Assignee: Western Electric Company, Incorporated, New York, N.Y.

[22] Filed: Jan. 8, 1973

[21] Appl. No.: 321,730

[52] U.S. Cl. .......... 179/175.2 R, 179/18 FH

[51] Int. Cl. .......... H04m 3/10

[58] Field of Search.. 179/175.2 R, 175.2 C, 18 FH, 179/27 DB

[56] References Cited

UNITED STATES PATENTS

| | | | |
|---|---|---|---|
| 3,159,721 | 12/1964 | Deming et al. | 179/175.2 R |
| 2,695,928 | 11/1954 | Joel | 179/18 FH |
| 2,878,328 | 3/1959 | Gohorel | 179/175.2 R |

*Primary Examiner*—Kathleen H. Claffy
*Assistant Examiner*—Douglas W. Olms
*Attorney, Agent, or Firm*—C. H. Davis

[57] ABSTRACT

An arrangement for identifying trunks connected to stuck senders is disclosed. When a sender encounters trouble it marks the trunk connected to it and bids for a scanner to search for the marked trunk. To avoid ambiguous identifications in the event another sender marks a second trunk before the first sender and trunk are identified, the scanner pauses during the presence of simultaneous bids to allow the subsequent bids to release before scanning is resumed.

9 Claims, 5 Drawing Figures

IDENTIFIER ARRANGEMENT

FIELD OF THE INVENTION

The proper operation of an automatic telephone switching system depends upon numerous units of equipment reliably performing their designated functions. As telephone systems become increasingly more complex, it is necessary that the status of all equipment units be monitored to ascertain which units are experiencing trouble. Accordingly, most switching systems include apparatus for identifying units of equipment that have encountered trouble to permit maintenance personnel to remove the equipment from service so that the trouble can be located and cleared.

BACKGROUND OF THE INVENTION

Many trouble identifier arrangements have been proposed for use in locating and analyzing equipment failures in a telephone switching system. In one example, all units of equipment are equipped with status indicators and when a particular unit encounters trouble, it identifies itself by actuating the appropriate status indicators, such as a series of progress lamps on a display panel.

Providing individual status indicators for every unit of equipment in a switching system is, of course, very inefficient, particularly when it is expected that trouble conditions will not occur frequently. It has been proposed, therefore, to utilize common identifier apparatus which is shared by the various units of equipment requiring identification and which is only operated when one of the units encounters trouble and requires identification. With the sharing of a common identifier it is necessary to provide certain safeguards to avoid ambiguous identities in the event two or more units simultaneously request identification. This has been accomplished in the past by the use of preference and lock-out circuitry whichlocks out all units except one during the identification process. In the presence of simultaneous demands, the bidding circuits are permitted to queue and one circuit is selected for identification. After the first unit is identified, the other units are sequentially unlocked, one at a time, until each unit is identified.

Preference and lock-out circuits, while suitable for their intended purpose, tend to become more complex as the number of units to be identified increases. The complexity further increases if the preference and lock-out arrangement is designed to unlock the units in the same order that the units requested identification.

It is therefore, one object of my invention, to provide a flexible and efficient identifier circuit which avoids the problems of ambiguous identification when two or more circuits simultaneously request identification.

Another object of my invention is to provide an identifier arrangement without the necessity of complex and expensive queuing, preference and lock-out equipment.

SUMMARY OF THE INVENTION

These and other objects are attained in one illustrative embodiment of the invention, wherein an identifier is arranged to momentarily pause during the identification process if simultaneous identification requests are received. During this pause, all but one of the requests are withdrawn and the identifier can then continue the processing of the remaining request.

More specifically and in accordance with the disclosed embodiment of the invention in a telephone system, an identifier is arranged to identify the trunks connected to senders which have experienced trouble. When the sender encounters trouble it marks the trunk connected to it via a sender link and bids for identification. The identifier locks to the first sender requesting identification and begins scanning all trunks looking for the marked trunk. While the scanner is searching for the first marked trunk another sender might also encounter trouble and mark a second trunk. If the scanner were to continue searching, it might erroneously identify the second trunk as being connected to the first sender. In the presence of more than one identification request, therefore, the scanner momentarily pauses while holding the first sender busy to permit the withdrawal of all but the first sender's request. The other senders automatically withdraw their requests for identification and when all but the original request have been withdrawn, the scanner resumes looking for the marked trunk.

BRIEF DESCRIPTION OF DRAWING

A better understanding of the arrangement contemplated will be had with the following description made with respect to the drawing in which.

Figure 1:
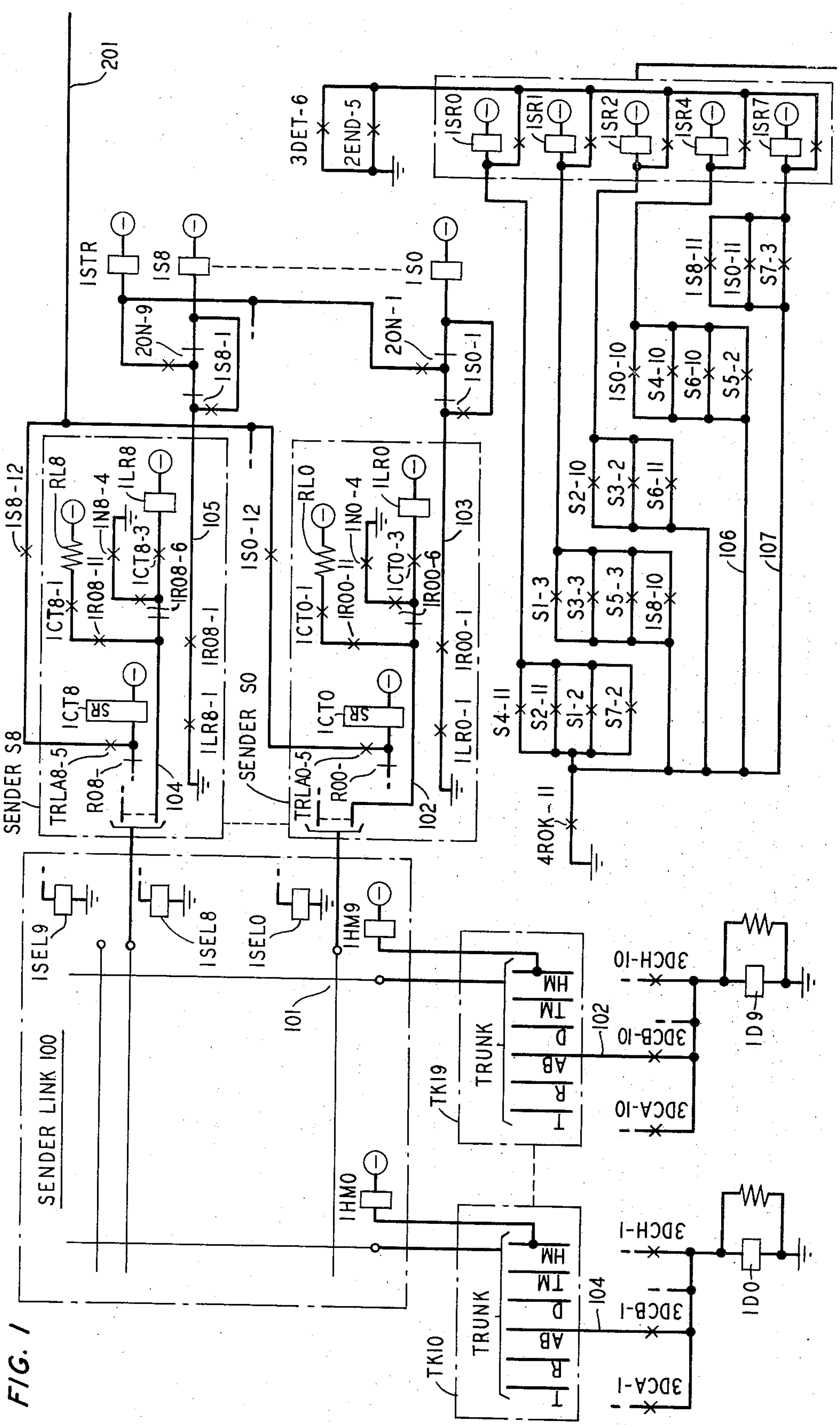
FIG. 1 shows a portion of the identifier circuit and a typical sender link for interconnecting senders and trunks in a telephone system.

Whenever possible the apparatus has been given a combined number and letter reference designation. The number preceding the letter designation indicates the figure of the drawing in which the apparatus appears and the letters are generally abbreviations for the functions of the apparatus. The contacts of the relays are given the same reference designations as their windings, followed by the contact number.

DESCRIPTION OF OPERATION

Typically, a telephone call is forwarded over an inter-office trunk by connecting a sender to the originating end of the trunk and causing the sender to outpulse signals representing the called telephone number. If trouble is encountered during the establishment of this connection, the common control equipment can record the trouble since it generally contains the identities of the units of equipment engaged on the call.

Certain troubles occur, however, after the common control has released and while the sender is waiting for the distant office to get ready to receive the information to be outpulsed. These troubles are generally categorized as "stuck sender" troubles and require that the sender identify itself and mark the trunk to which it is connected so that the trunk can also be identified.

While the present invention is being depicted in a stuck sender trunk identifier arrangement, it will be obvious from the following description that the invention has a much wider application.

FIG. 1 shows a portion of a typical sender link 100 in a telephone switching system. Sender link 100 comprises a plurality of crossbar switches with senders, such as SO and SB, being connected to the horizontals and trunks, such as TK10 and TK19 being connected to the verticals.

Trunks and senders are selected for interconnection by common control equipment which has not been shown to simplify the drawing. When the equipment units have been selected, the common control equipment operates the appropriate sender link select and hold magnets to interconnect the trunk and sender over a plurality of crosspoints. For purposes of illustration, let it be assumed that sender SO has been connected to trunk TK19 by the operation of select magnet 1SELO and hold magnet 1HM9. A plurality of conductors are extended between the two circuits via crosspoint 101.

When interoffice trunk TK19 was selected, a signal was sent over the trunk to prepare the distant office (not shown) to receive the called telephone number to be outpulsed by sender S0. During this procedure many events can occur which will prevent the sender from completing its tasks. If the sender is unable to perform its function within an allotted interval, reorder relay R0- and a trouble release relay TRL (not shown) are actuated in the sender to begin the identification process. Relay R0- in the sender also marks the trunk the sender is connected to by changing the resistance battery on lead AB from 2,500 ohms to 226 ohms. This circuit for sender S0 and trunk TK19 can be traced from battery through resistance RL0, make contacts 1CT0-1 and 1R00-1, through trunk equipment not shown and over conductor 102, through crosspoints 101 to trunk TK19. Relay 1R00 and its operating circuits have not been shown to simplify the drawing.

The identifier contains a sender start relay designated S- associated with each sender. Only relays 1S0 and 1S8 are shown and relay 1S0 is operated when sender S0 encounters trouble. The operating path for this relay includes battery through its winding, through break contacts 20N-1 and 1S0-1, over conductor 103 and through make contacts 1R00-1 and 1LR0-1 to ground. Relay 1S0, in operating, actuates its contacts 1S0-1 to prepare an alternate path for holding operated relay 1S0 when relay 20N operates. With any one of the sender start relays operated off-normal relay 20N operates in FIG. 2. The circuit for operating relay 20N includes make contacts 1S0-9 and break contacts 3DET-6. Once operated, relay 20N locks to a circuit including diode 2D and contacts 20N-10. Relay 20N also actuates its contacts 20N-11 in FIG. 3 to remove ground from conductor 300 and TM timer 301. Removal of this ground causes TM timer 301 to being timing an interval of approximately 9 to 10 seconds. It is during this interval that the identifier is expected to complete all its functions. If, for any reason the identifier does not return to normal within the allotted 9 to 10 seconds, timer 301 times out operating relay 3TM which in turn operates relay 4TRL in FIG. 4. Relay 4TRL will hold the identifier out of service until released by the maintenance personnel.

Figure 2:
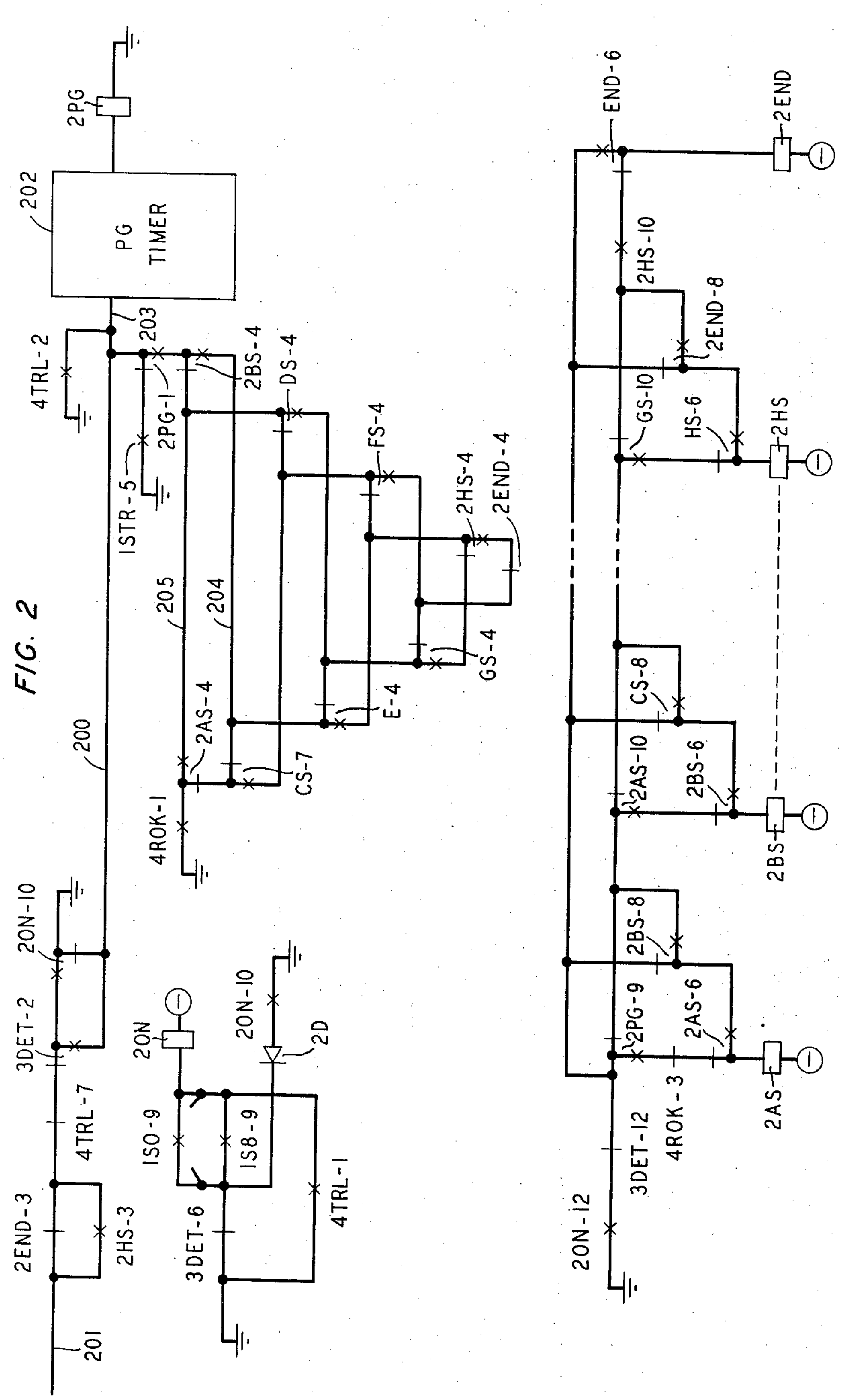
FIGS. 2 and 3 show other portions of the identifier circuit.

At its contacts 20N-10 in FIG. 2, relay 20N removes ground from conductors 200 and 203 to start pulse generator timer 202. This same ground is connected through break contacts 3DET-2, 4TRL-7 and 2END-3, over conductor 201 to FIG. 1, through make contacts

1S0-11 and TRLA0-5 in sender S0 to lock operated relay 1CT0 in the sender. By holding relay 1CT0 operated in the sender, the identifier can prevent the sender from releasing in a well known manner until the identification process has been completed.

The operating paths for the other sender start relays, such as 1SB, are interrupted at this time by contacts of relay 20N. This prevents more than one sender start relay from operating in the event another sender encounters trouble while the identifier is attempting to identify the trunk connected to sender S0.

Timer 202 times an interval of approximately 60 to 70 milliseconds after which relay 2PG operates and when relay 2PG operates, a circuit is completed for operating steering relay 2AS. This circuit includes battery through the winding of relay 2AS, break contacts 2AS-6 and 4ROK-3, make contacts 2PG-9, break contacts 3DET-12 and make contacts 20N-12 to ground. Relay 2AS locks through its make contacts 2AS-6 and break contacts 2BS-8 to the ground on contacts 20N-12. Relay 2AS also closes its make contacts 2AS-7 in FIG. 4 to complete an obvious operating circuit for reorder check relay 4ROK. With relay 4ROK operated, the identifier can begin scanning the trunks connected to sender link 100. At its make contacts 4ROK-11 in FIG. 1 relay 4ROK extends ground over conductors 106 and 107, through make contacts 1S0-10 and 1S0-11 to operate sender registration relays 1SR4 and 1SR7 thereby indicating that sender S0 has requested identification.

In this illustrative embodiment, the trunks on the sender link are scanned by connecting detector relays 1D0 through 1D9 to groups of 10 trunks by the operation of detector connector relays 3DCA through 3DCH. The connector relays 3DCA through 3DCH are operated in sequence under control of the steering relays 2AS through 2HS and pulse generator relay 2PG. With relays 4ROK and 2AS operated, a circuit is completed for operating the first detector connector relay 3DCA. This circuit includes battery through the winding of relay 3DCA, make contacts 2AS-1 and through break contacts 4TRL-3 to ground on make contacts 4ROK-4. At its make contacts 3DCA-1 through 3DCA-10 in FIG. 1, relay 3DCA connects the AB leads from ten trunks on sender link 100 to detector relays 1D0 and 1D9. Since the only trunk marked with a low resistance battery on its AB lead is trunk TK19 and that trunk is not in this group, none of the detector relays will operate at this time.

When relays 4ROK and 2AS operated, a circuit was completed in FIG. 2 for reconnecting ground to conductor 203 of timer 202. This circuit includes make contacts 4ROK-1 and 2AS-4, conductor 205 break contacts 2BS-4 and make contacts 2PG-1. The application of ground to conductor 203 turns timer 202 off to cause the release of relay 2PG. When relay 2PG releases, it actuates its transfer contacts 2PG-1 to remove ground from conductor 203 thereby restarting timer 202.

Figure 3:
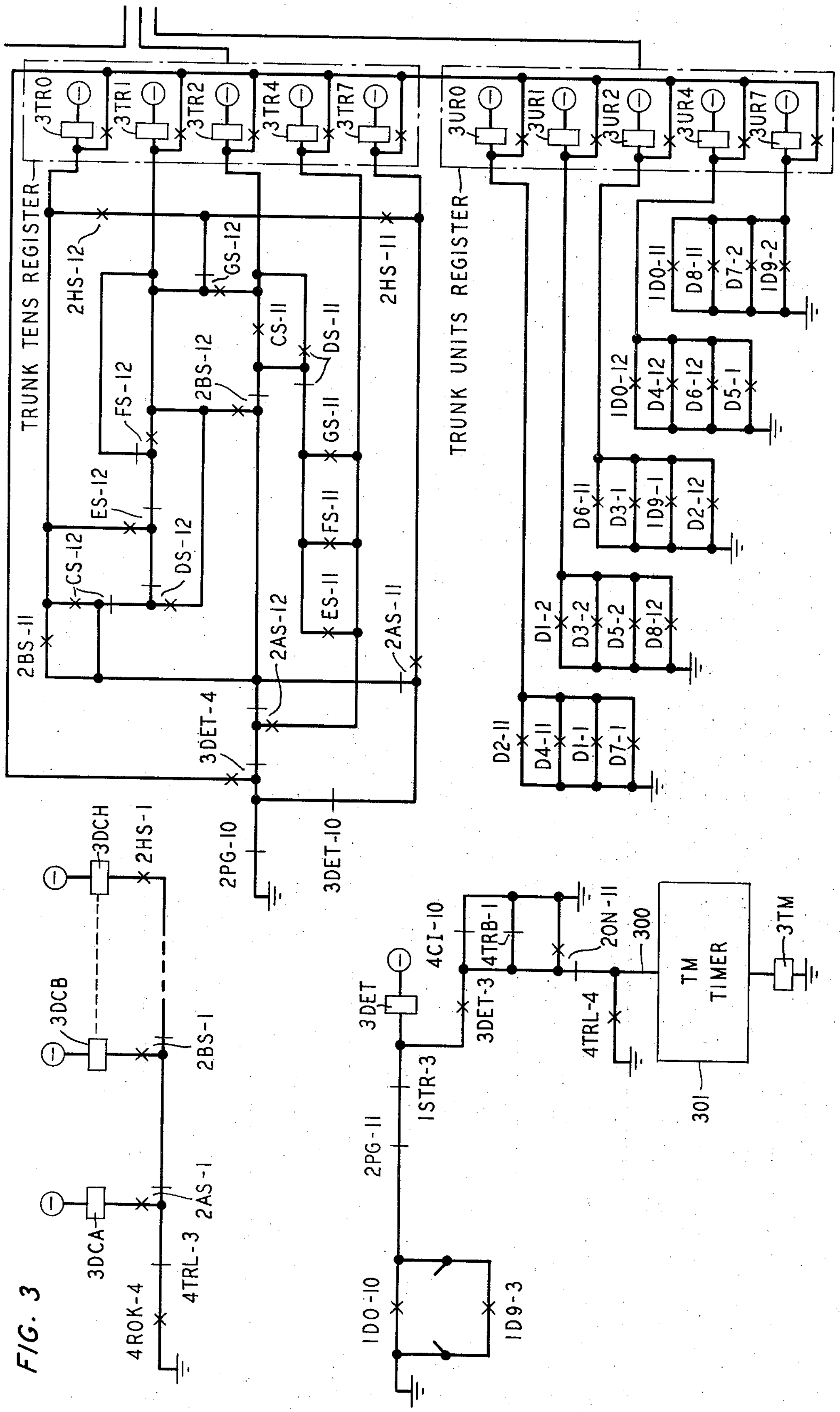
Figure 5:
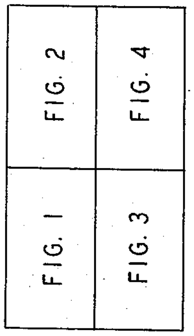
FIG. 5 shows the arrangements of FIGS. 1–4.

When relay 2PG is released a circuit is completed in FIG. 3 for operating tens register relays 3TR4 and 3TR7 indicating that the scanner is examining the first group of ten trunks. The circuit for operating relay 3TR7 can be traced from battery through the winding of relay 3TR7, make contacts 2AS-11, break contacts 3DET-10 and 2PG-10 to ground. A similar circuit can be traced for relay 3TR4.

Relay 2PG, in releasing, also operates the next steering relay 2BS in preparation for scanning the next group of ten trunks. The operating circuit for relay 2BS includes battery through its winding, through break contacts 2BS-6, make contacts 2AS-10, break contacts 2PG-9 and 3DET-12 and make contacts 20N-12 to ground. At the end of the timing interval relay 2PG operates and at its contacts 2PG-9 opens the locking circuit for relay 2AS which releases. Contacts 2PG-10 in FIG. 3 are also opened at this time releasing tens register relays 3TR4 and 3TR7.

With relay 2AS released and relay 2BS operated ground is extended from make contacts 4ROK-1 in FIG. 2, through break contacts 2AS-4 and CS-7, over conductor 204, through make contacts 2BS-4 and 2PG-1 to conductor 203 thereby stopping timer 202 and releasing relay 2PG.

Relay 2PG, in releasing, completes circuits in FIG. 2 for operating tens register relays 3TR0 and 3TR1 to identify the next tens group of trunks. Relay 3TR0 operates over a circuit including battery through its winding, make contacts 2BS-11, break contacts 2AS-12 and 3DET-4 to ground through make contacts 2PG-10. Relay 3TR1 operates over a similar circuit including make contacts 2BS-12.

The release of relay 2AS and the operation of relay 2BS also completes a circuit for operating the next detector connector relay 3DCB in FIG. 3 and with relay 3DCB operated the next group of ten trunks (including the marked trunk TK19) is connected to detector relays 1D0 through 1D9. Relay 1D9 operates because of the low resistance battery connected to its AB conductor 102 from the sender and, in operating, relay 1D9 completes a circuit for operating detection relay 3DET. This circuit can be traced from battery, through winding 3DET, through break contacts 1STR-3 and 2PG-11 to ground on contacts 1D9-3. Relay 3DET locks through its own contacts 3DET-3 to ground on contacts 20N-11, 4TRB-1 or 4CI-10.

Relay 1D9 also closes its make contacts 1D9-1 and 1D9-2 to complete obvious circuits for operating units register relays 3UR2 and 3UR7 to identify the units digit of the marked trunk.

When relay 3DET operates it performs several functions which will be described at this time. At its contacts 3DET-1 in FIG. 4, relay 3DET transmits ground to alarm circuit 400 thereby alerting the maintenance personnel that a stuck sender has been detected and the trunk connected thereto has been identified. At its make contacts 3DET-6 in FIG. 1, relay 3DET provides a locking circuit for sender registration relays 1SR4 and 1SR7 and at its transfer contacts 3DET-4 in FIG. 3 the operating circuits for tens register relays 3TR0 and 3TR1 are opened and a locking circuit is provided for the tens and units register relays 3TR0, 3TR1, 3UR2 and 3UR7. Relay 3DET also opens its make contacts 3DET-12 in FIG. 2 to release steering relay 2BS and relay 2BS releases relay 3DCB which in turn disconnects the detector relays from the ten trunks in the second group. Detector relay 1D9 releases at this time.

When relay 3DET operates its transfer contacts 3DET-2 in FIG. 2, it also removes ground from conductor 201 to release relay 1CT0 in sender S0. This causes the sender to release and remove the ground from start conductor 103 thereby releasing the sender start relay 1S0. Relay 1S0 opens its make contacts 1S0-9 in FIG. 2 to release off-normal relay 20N.

Figure 4:
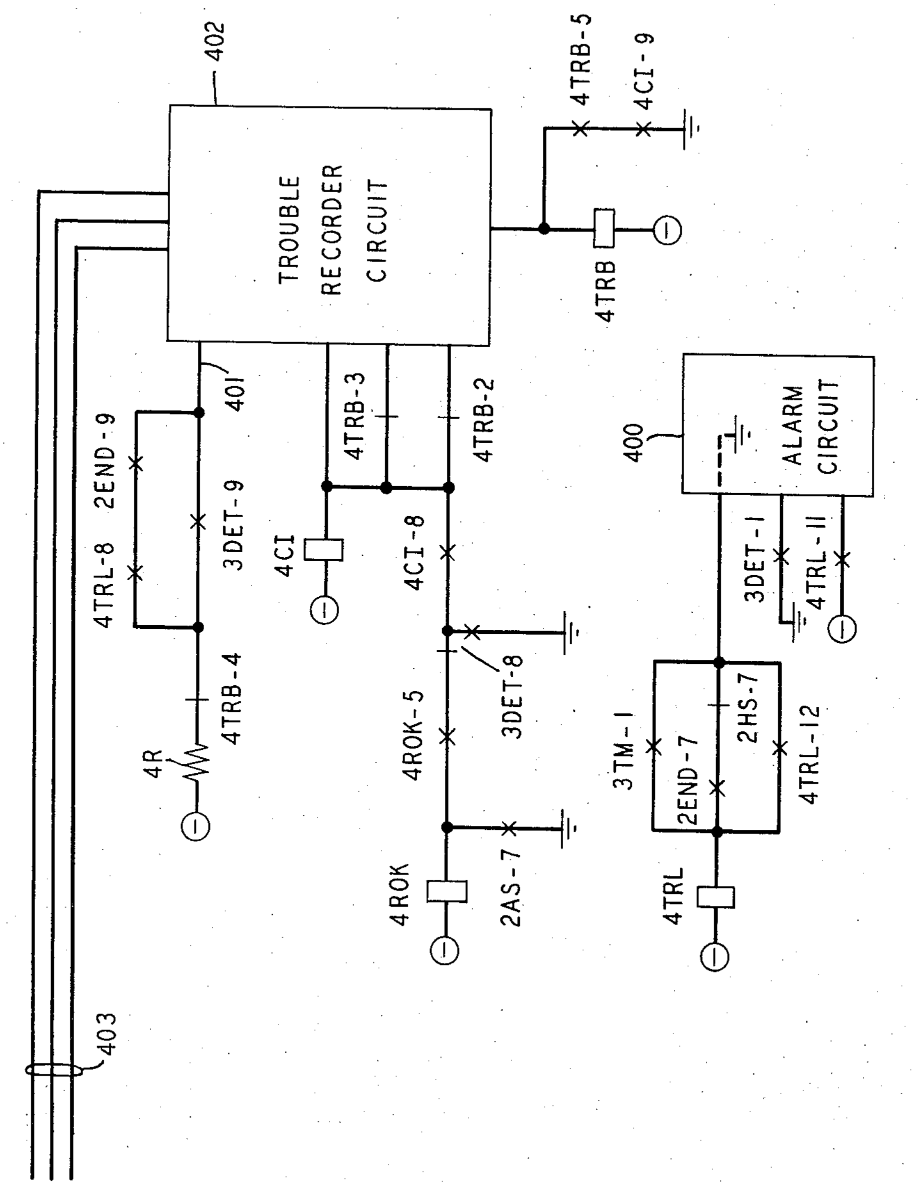
FIG. 4 shows a block diagram of equipment used for recording the identified circuits and the circuitry for actuating the recorder.

At its contacts 3DET-9 in FIG. 4, relay 3DET connects battery over start conductor 401 to actuate trouble recorder 402. Recorder 402 can be any type of trouble recording device, such as a card punch mechanism capable of recording the sender number, the trunk number and any other pertinent information, such as the time of day when the record was made. Recorder 402 indicates its availability by operating cut-in relay 4CI in the identifier and the identities of the sender and trunk are forwarded over cables 403 from the register relays to the trouble recorder circuit 402. Relay 4CI, in operating its contacts 4CI-10, opens one of the locking paths for relay 3DET. When the trouble recorder 402 finishes its functions, it operates trouble recorder busy relay 4TRB in the identifier. With relays 4CI and 4TRB operated, and relay 20N released, all locking paths for relay 3DET are opened and relay 3DET releases.

Relay 3DET at its contacts 3DET-9 in FIG. 4 interrupts the start lead 401 to the trouble recorder 402 and recorder 402 releases thereby releasing relays 4CI and 4TRB. At its contacts 3DET-4 and 3DET-6, the locking circuits for the various register relays are interrupted and these relays also release. The identifier circuit is now in its normal state and is ready to make another identification.

CONCURRENT IDENTIFICATION REQUESTS

As discussed above, the telephone switching system contains several senders which may concurrently be interconnected with trunks via the sender link. Since the senders function autonomously, it is possible for two or more senders to encounter trouble concurrently. When this occurs, the identifier must avoid ambiguous or erroneous identifications.

To illustrate how the present identifier handles concurrent requests for identification, let it be assumed that sender S0 has encountered trouble and has marked trunk TK19 for identification. Sender S0 operates its sender start relay 1S0 to bid for identification and the identifier prepares itself for scanning the groups of trunks by operating off-normal relay 20N, pulse generator relay 2PG and reorder check relay 4ROK. With these relays operated as described above, the identifier can begin sequentially actuating detector connector relays 3DCA through 3DCH. Let it now be assumed that another sender, such as SB, has encountered trouble and has marked trunk TK10 for identification by connecting a low resistance battery to AB conductor 104. If the identifier were to continue scanning the trunks as in the previous example, it can be seen from FIG. 1 that both detector relays 1D0 and 1D9 will operate when detector connector relay 3DCB is operated. If this were permitted to occur the identifier would not be able to ascertain the number of the trunk connected to sender S0, which initially requested identification.

In accordance with one feature of this invention, the identifier is arranged to pause during the scanning process if more than one sender requests identification. More specifically, and with reference to FIG. 1, sender SB extends ground through make contacts 1LR8-1 and 1R08-1, over conductor 105, through make contacts 20N-9 and through the winding of second trouble release relay 1STR. It will be noted that since off-normal relay 20N is operated, all of the start leads from the senders have been transferred to the winding of relay 1STR to prevent the operation of more than one sender start relay S-.

At its break contacts 1STR-3 in FIG. 3, relay 1STR interrupts the operating path for relay 3DET to prevent this relay from operating. It will be recalled from the above description that relay 3DET, when operated, begins a series of events which results in the recording of the sender and trunk identities by trouble recorder 402. Relay 1STR also actuates its make contacts 1STR-5 in FIG. 2 to connect ground to conductor 203 and pulse generator timer 202. This stops the timer and prevents relay 2PG from stepping the steering chain relays 2AS through 2HS thereby halting the scanning operation.

Since the start relay 1SB associated with sender S8 did not operate, relay 1CT8 in the sender cannot be locked operated by the identifier to prevent sender S8 from releasing but relay 1CT0 remains operated in sender S0 to prevent the release of sender S0.

The release of the CT-relays causes the release of the LR- relays in the various senders thereby causing the senders to release. The release of relay 1LR8 in sender S8 removes ground from conductor 105 causing second trouble release relay 1STR to release. Relay 1STR, in releasing, removes the ground from the input conductor 203 of timer 202 and allows the identifier to resume scanning where it left off.

In the prior example it was assumed that a sender encountered trouble and marked a particular trunk which was found by the scanning operation in the identifier. Upon finding the marked trunk, the scanner was stopped and a record was made indicating the sender and trunk numbers. If the scanner advances through all trunks without detecting a marked trunk, the end of steering chain relay 2END operates. Upon the next operation of pulse generator relay 2PG, relay 2HS is released and a circuit is completed in FIG. 4 for operating relay 4TRL. This circuit includes ground through equipment not shown in alarm circuit 400, break contacts 2HS-7, make contacts 2END-7 and the winding of relay 4TRL to battery.

Relay 4TRL operates at this time and performs several functions. At its break contacts 4TRL-7 in FIG. 2 it interrupts the circuit for holding the senders actuated via conductor 201. This permits any stuck senders to release to serve other calls. Relay 4TRL closes its make contacts 4TRL-11 in FIG. 4 to actuate an alarm in alarm circuit 400. In FIG. 4, battery is also extended through resistance 4R, break contacts 4TRB-4, make contacts 4TRL-8 and 2END-9 and over start conductor 401 to trouble recorder 402. This bids for the trouble recorder to take a record of the sender number even though no trunk number has been identified. At its make contacts 4TRL-1 in FIG. 2, relay 4TRK holds off-normal relay 2ON operated to maintain the identifier out of service and at its make contacts 4TRL-2, ground is extended over conductor 203 to stop timer 202. The identifier will now remain out of service until released by maintenance personnel.

Thus, it can be seen from the above description that the identifier will respond to one equipment unit encountering trouble to identify that unit by scanning all units until a marking signal is detected on the defective unit. If, however, two or more units concurrently request identification, the scanner automatically pauses to permit all requests to be withdrawn except one. When only one request for identification remains, the scanner resumes polling until the defective unit is found.

What is claimed is:

1. Apparatus for identifying a particular one of a plurality of units of equipment in response to a request from said particular unit comprising means for applying a marking signal to said particular unit to be identified, means connectable to said units for detecting said marking signal, scanner means operative in response to a first request signal received from said particular unit for connecting said detecting means to each said unit, and means effective upon the receipt of a second request signal received from another of said units for temporarily disabling said scanner means during the interval both said first and second request signals are present.

2. The invention defined in claim 1 wherein said detecting means comprises a bistable device actuated in response to said marking signal, and wherein said scanner means comprises a plurality of coupling devices each operable to connect one of said units to said bistable device, and sequence means for sequentially operating said coupling devices.

3. The invention defined in claim 2 wherein said sequence means comprises a plurality of bistable elements and timing means for individually operating said bistable elements at prescribed intervals, and wherein said disabling means comprises means actuated in the presence of concurrent first and second request signals for blocking the further actuation of said bistable elements.

4. The invention defined in claim 3 wherein said disabling means further comprises means actuated in the presence of concurrent first and second request signals for blocking the actuation of said timing means.

5. In a system having a plurality of first equipment units individually connectable with a plurality of second equipment units wherein each first unit transmits a marking signal to the second unit connected thereto, an arrangement for ascertaining the identity of the second unit connected to a particular one of said first units comprising detector means responsive to said marking signal, scanner means effective when actuated for connecting said detector means to each said second unit, means responsive to a request signal from said particular first unit for actuating said scanner means, and means effective during the presence of said first request signal and upon the receipt of a second request signal from another of said first units for disabling said scanner means.

6. In a telephone system having trunks connectable to senders wherein each sender includes means for transmitting a marking signal to the trunk connected thereto, an arrangement for identifying the trunk connected to a particular one of said senders comprising first detector means connectable to said trunks for detecting said marking signal, scanner means enabled in response to a first request signal received from said particular sender for sequentially connecting said first detector means to each said trunk, and means effective upon the receipt of a second request signal from another of said senders for temporarily disabling said scanner means until only said first request signal is present.

7. The invention defined in claim 6 wherein said identifying arrangement further comprises a start circuit associated with each said sender for detecting a request signal from said associated sender and wherein said disabling means comprises circuit means responsive to the actuation of a first one of said start circuits in response to said first request signal for blocking the actuation of other ones of said start circuits.

8. The invention defined in claim 7 wherein said first detector means comprises relay means responsive to said marking signal, wherein said scanner means comprises a plurality of connector relays and a stepping circuit for sequentially operating said connector relays one at a time, and wherein said disabling means further comprises second detector means jointly actuated by said circuit means and said second request signal for interrupting the operation of said stepping circuit.

9. The invention defined in claim 7 wherein each said sender comprises timing means associated therewith for controlling the transmission of said request signal to said identifier arrangement for a predetermined interval and for releasing said sender at the end of said interval and wherein said circuit means further comprises means for preventing the release of said particular sender by blocking the actuation of said timing means of said particular sender.

* * * * *